Patented Oct. 7, 1947

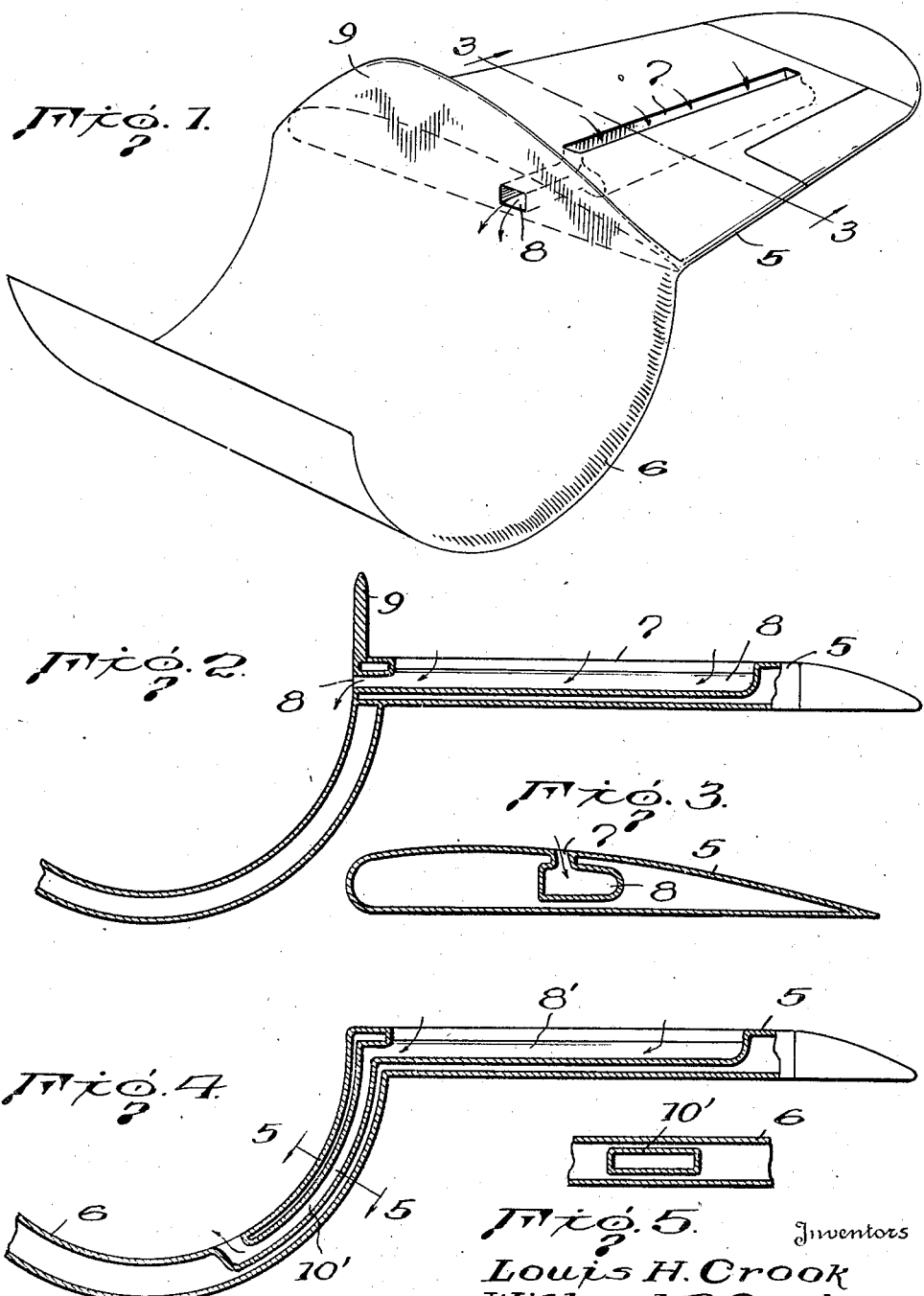

2,428,737

UNITED STATES PATENT OFFICE 2,428,737

BOUNDARY LAYER REMOVER FOR AIR-
PLANES

Louis H. Crook, Washington, D. C., and Willard
R. Custer, Hagerstown, Md.

Application August 28, 1942, Serial No. 456,549

3 Claims. (Cl. 244—40)

This invention consists of a boundary layer remover for airplanes, and has especial adaptation for use on channel or scoop type wings as illustrated in the Custer application Serial Number 439,257.

Many efforts have been made and some success attained in removal of the atmospheric band or film which adheres to the wings or other airfoil parts of standard airplanes, the band or film being known in the art as the boundary layer. In attempting to eliminate, or at least to minimize this condition, such expedients as wing slots, suction and pressure areas on the upper wing surfaces, auxiliary wings, etc., have been experimented with; some of these completely fail at high speeds or are unable to adapt themselves to varying flight conditions, or are too heavy, or require special operating mechanism, etc., hence have for the most part failed of adoption. With the instant invention, we have found that the so called boundary layer may be intercepted and by-passed to a remote part of the wing without in any way interfering with the aerodynamics of the plane.

It is also within the contemplation of this invention to prevent air spill into the channel or scoop over the outer wall of the latter, and to eliminate possibility of the by-passed turbulent air from returning to the surface from which it was removed, and this is accomplished either by use of vertical risers or fins, as illustrated in the Custer application Serial Number 355,055, or by discharging or emptying the by-passed air into the scoop at a point remote from the top of the latter.

Other objects will suggest themselves to those skilled in the art from the following specification taken in connection with the accompanying drawings, wherein Figure 1 is a perspective view of a wing constructed in accordance with the present invention;

Figure 2 is an elevational view of the wing, a part thereof being broken away to disclose details of the trough and conduit;

Figure 3 is a transverse sectional view taken on the line 3—3 of Figure 1;

Figure 4 is an elevational view of a modified form of wing, a part thereof being broken away to disclose details; and Figure 5 is a fragmentary transverse sectional view of the wing taken on the line 5—5 of Figure 4, looking in the direction of the arrows.

This invention contemplates the use of the Custer channel or scoop type wing which may be engaged to a fuselage or airplane body, in any suitable manner. The wing, designated 5, includes a channel or scoop portion 6, the outer end of the wing including a tip of conventional design. Preferably the wing is airfoil.

The wing 5 is provided with an elongated trough or groove 7 which runs longitudinally through the wing and opens through the top face of the latter. As shown in Figs. 2 and 3 the groove runs parallel to the long axis of the wing and opens immediately aft of the point of maximum thickness of the airfoil, the groove or trough opening into a conduit 8. The inner end of the conduit 8 communicates with and empties into the scoop 6.

In a preferred form of the invention a fin 9 rises from the upper surface of the wing 5, at the inner end of the latter, and may extend from the leading edge to the aft edge of the latter. As illustrated in the drawings, the fin is of appreciable heighth to prevent over-spill of air from the top wing tip surface into the channel or scoop 6. Furthermore, by this arrangement, the air by-passed through the trough 7 and conduit 8 into the channel or scoop, will be baffled from return to the wing surface.

In a modified form of the invention shown in Figs. 4 and 5 the fin 9 may be omitted and in its stead the conduit 8 placed in communication with an air-passageway 10 formed in the outer wall of the channel or scoop 6. In this way the by-passed air will be carried downwardly to or adjacent the base of the channel or scoop before being released.

In use of this invention, the distorted air stream or turbulent air on the upper surface of the wing, referred to in the art as the boundary layer, will be intercepted by the trough 7 and by-passed through the latter and the conduit 8 into the scoop 6, with obvious results. Consequently, the boundary layer is automatically taken care of, regardless of the rate of speed or angularity at which the airplane is traveling. It adds neither weight or resistance to the airplane and requires no attention from the pilot.

With the present invention it is preferred that the thickness of the wing body be increased to give greater lift which will be capable of high speed work, because of the boundary layer remover. We are of course aware that many changes may be made in the contour of the wing and in the particular means employed for by-passing the intercepted air. Furthermore we have found that the fin may be formed in various ways and in various contours and formed integral with or separate from the wing, within the scope of this invention. Various other changes will manifest themselves to those skilled in the art without departing from the spirit of the appended claims.

What is claimed is:

1. An airplane wing comprising a first portion and a second contiguous portion disposed consecutively in a spanwise direction, said first portion being shaped to form an upwardly opening trough extending in the direction of flight from the leading edge to the trailing edge of the wing, the upper surface of said second portion being provided with a slot, a conduit leading from said slot to the inner surface of said first portion, and means at the juncture of said portions arranged to obstruct the passage of air between the upper surfaces of said portions, whereby the boundary layer associated with said second portion will tend to be drawn into said trough whenever a reduction in pressure is induced at the inner surface of said first portion.

2. In an airplane wing, a wing portion having a channel, the channel opening upwardly and running in the direction of flight from the fore to the aft edge of the wing, a second wing portion adjacent the first named wing portion, being provided with a trough which opens through the upper face of the wing, one terminal of the trough emptying into the channel, and means on the wing extending upwardly from the channel, to obstruct overflow of air into the channel.

3. In an airplane wing, a wing portion having a channel, the channel opening upwardly and running in the direction of flight from the fore to the aft edge of the wing, a second wing portion having a slot in its upper surface which communicates with the channel through a side wall of the latter, and a vertical fin extending upwardly from the wing, adjacent the channel, to reduce the volume of air, by-passed from the upper surface of said second portion of the wing into the channel, from returning to said upper surface and to curtail overspill of air from the upper surface of said second wing portion into the wing channel.

LOUIS H. CROOK.
WILLARD R. CUSTER.

REFERENCES CITED

The following references are of record in the file of this patent:

UNITED STATES PATENTS

| Number | Name | Date |
|---|---|---|
| 1,943,774 | Shaw | Jan. 16, 1934 |
| 1,513,241 | Harding | Oct. 28, 1924 |
| 1,980,139 | Jones | Nov. 6, 1934 |
| 2,041,792 | Stalker | May 26, 1936 |
| 2,041,793 | Stalker | May 26, 1936 |
| 1,986,064 | Leray | Jan. 1, 1935 |
| 2,071,221 | Schramm | Feb. 16, 1937 |
| 1,868,832 | Henter et al. | July 26, 1932 |
| 1,913,809 | Lanier | June 13, 1933 |

FOREIGN PATENTS

| Number | Country | Date |
|---|---|---|
| 518,663 | Great Britain | Mar. 5, 1940 |